US012759734B2

(12) United States Patent
Zhou et al.

(10) Patent No.: US 12,759,734 B2
(45) Date of Patent: Oct. 13, 2026

(54) LIQUID-CURTAIN TYPE HEAT DISSIPATION STRUCTURE FOR LIDAR ONBOARD UNMANNED AERIAL VEHICLE

(71) Applicant: GUILIN UNIVERSITY OF TECHNOLOGY, Guilin (CN)

(72) Inventors: Guoqing Zhou, Guilin (CN); Wei Liu, Guilin (CN)

(73) Assignee: GUILIN UNIVERSITY OF TECHNOLOGY, Guilin (CN)

( * ) Notice: Subject to any disclaimer, the term of this patent is extended or adjusted under 35 U.S.C. 154(b) by 98 days.

(21) Appl. No.: 18/798,177

(22) Filed: Aug. 8, 2024

(65) Prior Publication Data

US 2026/0062156 A1 Mar. 5, 2026

(51) Int. Cl.

| | |
|---|---|
| ***B64U 20/98*** | (2023.01) |
| ***B64U 20/80*** | (2023.01) |
| ***G01S 7/481*** | (2006.01) |
| *G01S 17/89* | (2020.01) |

(52) U.S. Cl.
CPC ............ *B64U 20/98* (2023.01); *B64U 20/80* (2023.01); *G01S 7/481* (2013.01); *G01S 17/89* (2013.01)

(58) Field of Classification Search
CPC ......... B64U 20/98; B64U 20/80; G01S 7/481; G01S 17/89; G01S 7/4813
See application file for complete search history.

(56) References Cited

FOREIGN PATENT DOCUMENTS

| | | | |
|---|---|---|---|
| CN | 211696023 U | * | 10/2020 |
| CN | 212293624 U | * | 1/2021 |

* cited by examiner

*Primary Examiner* — Harry E Arant
(74) *Attorney, Agent, or Firm* — Bochner PLLC; Andrew D. Bochner

(57) ABSTRACT

A liquid-curtain type heat dissipation structure for LiDAR onboard unmanned aerial vehicle, belonging to the field of LiDARs. The structure is used to solve the problem that the existing device onboard UAV is difficult to meet heat dissipation requirements of LiDAR onboard UAV due to limited energy source during operation. The structure is provided on a LiDAR box body, a liquid storage tank is built into the top of a box lid to store cooling liquid. Meanwhile, the liquid storage tank is provided with a vent hole and a liquid outlet, and the vent hole is used to control flow velocity of the cooling liquid. During operation, the cooling liquid flows out from the liquid outlet, is guided to a heat dissipation panel through a liquid guide groove, and is attached to a surface of a heat dissipation panel.

3 Claims, 1 Drawing Sheet

LIQUID-CURTAIN TYPE HEAT DISSIPATION STRUCTURE FOR LIDAR ONBOARD UNMANNED AERIAL VEHICLE

CROSS-REFERENCE TO RELATED APPLICATION

This patent application claims the benefit and priority of Chinese Patent Application No. 202410020097.6 filed with the China National Intellectual Property Administration on Jan. 6, 2024, the disclosure of which is incorporated by reference herein in its entirety as part of the present application.

TECHNICAL FIELD

The present disclosure relates to the field of LiDARs, and in particular to a bathymetric LiDAR onboard unmanned aerial vehicle (UAV).

BACKGROUND

LiDAR, due to its advantages of high data accuracy, high acquisition density, strong anti-interference ability and high efficiency, is widely applied in various fields and has become a hot research topic. Bathymetric LiDAR, as a branch of lidar, has been widely applied in hydraulics, ships, marine hydrology, geological exploration and underwater survey. The principle of the LiDAR a technique to obtain the seafloor data by collecting the data of two laser pulse signals returned from the sea surface and the seabed, and then process the recovered data.

The LiDAR onboard UAV, as a rising star, has serious heat dissipation problems while developing rapidly. For example, a high-power laser and a high-speed data acquisition device operate at a temperature ranging from −20° C. to 60° C., while the common air-cooled heat sink cannot meet the demand. The traditional liquid-cooled device with better heat dissipation is difficult to be used in the LiDAR onboard UVA due to its high power consumption, large volume and large mass, and so is the semiconductor heat dissipation method with high power consumption. Therefore, a great deal of international research has been carried out on the heat dissipation of high-power LiDAR.

The patent No. CN202111156637.6 put forward by Zhao Xiaona et al. of Wuhan University is an invention patent of a LiDAR heat dissipation mechanism. Aiming at the low efficiency of a vehicle-borne LiDAR heat sink after a vehicle stops, a heat dissipation mechanism is provided, which can achieve efficient heat dissipation by controlling the start and stop of a heat dissipation fan through a wind speed sensor. However, the mechanism includes a large number of fans and control devices, and is only suitable for a mobile platform with energy supply.

In a paper entitled "Research on Thermal Control Technology of Spaceborne LiDAR Laser" wrote by Wan Yuan et al. from the Space Laser Engineering Department of Shanghai Institute of Optics and Fine Mechanics, Chinese Academy of Sciences. A solid-state laser in the spaceborne atmospheric detection LiDAR is subjected to thermal control design simulation and experimental study in a space environment, and the thermal design and simulation of laser in an orbit are carried out, and then a laser configuration is designed and optimized. Reference is provided for a thermal design of a high-power space LiDAR load.

In a paper entitled "Direct observation of heat dissipation in individual suspended carbon nanotubes using a two-laser technique" wrote by I-Kai Hsu et al. at the University of California, USA, in order to determine the efficiency of heat dissipation from a hot surface when a heat sink is bridged with carbon nanotube fins, the heat transfer and exchange between the surface of the carbon nanotube and its surrounding gas environment are studied.

The patent No. CN202310917171.X put forward by Liu Jia et al. of Benewake (Beijing) Co., Ltd. is an invention patent entitled "Receiving PCBA heat dissipation device, laser receiving module, and LiDAR". A heat conduction mechanism is provided for laser heat dissipation, which transfers the heat of the laser to a housing of the LiDAR to achieve the purpose of heat dissipation.

The patent No. CN202310116747.2 put forward by Hu Xiangming et al. of Ningbo Xintai Machines Co., Ltd., is an invention patent entitled "Heat dissipation structure of lidar". On one hand, a shading plate is used to prevent external heat from affecting a vehicle-borne LiDAR, and on the other hand, a heat dissipation block is added to dissipate heat from the LiDAR. However, due to lack of active heat dissipation, the heat dissipation efficiency is low.

The patent No. CN202320085303.2 put forward by Zhang Keshu of Beijing Tulai Laser Technology Co., Ltd., is an utility model patent entitled "Lidar and heat dissipation structure of LiDAR". The purpose of heat dissipation is achieved using a fan combination to form a thermal cycle inside the LiDAR.

In the prior art, the air-cooling heat dissipation efficiency is low, and it is difficult to satisfy high heat dissipation requirements of device onboard UAV. Although liquid-cooling heat dissipation can satisfy the heat dissipation requirements, its characteristics of high energy consumption, large mass and the like are too heavy for the device onboard UAV.

SUMMARY

For the problems above, a liquid-curtain type heat dissipation structure for LiDAR onboard UAV is provided, which has no additional energy consumption demand while taking into account the light weight and small size, and thus the requirements of a device onboard UAV are satisfied.

The technical solution is implemented as follows:

A heat dissipation structure for a LiDAR onboard UVA includes a box lid, a box seat, a LiDAR system in the box, and a rubber plug. The box lid is internally comprises a micro liquid storage tank for storing cooling liquid required, and the volume V of the box body should satisfy Formula (1) to ensure working time.

$$V \geq aT^{1.62}P^{-0.5}H^{-1.1}tS \tag{1}$$

where a is an environment influence coefficient, T is a temperature (° C.), P is an atmospheric pressure (Pa), H is ambient humidity (%), t is working time (h), and S is an area of a heat dissipation panel ($cm^2$).

Meanwhile, a liquid inlet, a liquid outlet, and a vent hole for controlling a flow rate at the liquid outlet are provided on the micro liquid storage tank. In order to ensure the stability of flow velocity of the cooling liquid at the liquid outlet and ensure the heat dissipation efficiency, a caliber of the vent hole should be less than or equal to ¼ of a total caliber of the liquid outlet, thus adjusting a liquid output amount. When there is more cooling liquid in the liquid storage tank, a pressure at the liquid outlet at the bottom of the liquid storage tank is strong, so the flow rate of the cooling liquid from the liquid outlet is greater than the air flow rate of the vent hole, and a negative pressure is formed in the tank to reduce the flow rate of the liquid outlet. A diameter of a single liquid outlet should be less than 1 mm, thus preventing a large amount of air from entering a box through the liquid outlet to reduce an adjustment effect of the vent hole. Multiple small-caliber liquid outlets can be set to satisfy the flow rate demand.

Meanwhile, a heat dissipation panel is integrally formed on the box lid to ensure the waterproof performance of a box body. A heat dissipation interface is provided on the heat dissipation panel, and a top of the heat dissipation interface is connected to the liquid outlet. The heat dissipation interface is arranged in rows on the heat dissipation panel in an S shape. Meanwhile, drainage channels are provided at the liquid outlet and various layers of the heat dissipation interface.

A contact angle θ between a surface material/coating on the heat dissipation interface and the cooling liquid should satisfy Formula (2) to ensure that the cooling liquid is attached to the heat dissipation interface and does not slide down.

$$\theta \leq 90^\circ \tag{2}$$

where $$\theta = \cos^{-1}\{0.55 \ln \gamma_s - 1.1 \ln \gamma_l - 0.5Ra^2\}$$

$\gamma_s$ is solid surface energy (mN/m), $\gamma_l$ is liquid surface energy (mN/m), and Ra is surface roughness of the heat dissipation panel.

The heat dissipation interface is processed as a surface with large roughness or an absorbent coating, the surface with large roughness or the absorbent coating is in cooperation with the drainage channels to ensure a maximum heat dissipation area of the cooling liquid. An inward fillet is provided at a lower end of the heat dissipation panel to avoid that under special circumstances, the cooling liquid enters the box and damages the device. The box seat is used as a main supporting structure of the box body to ensure the supporting stability of the box body. A LiDAR component in the box is fixed to the box seat. In order to ensure efficient heat dissipation, a laser and a high-speed data storage device and other devices with serious power consumption and heat generation are configured to attach to an inner side of the heat dissipation panel, and a heat conducting material is disposed between the laser as well as the high-speed data storage device and the box lid as a propagation medium. The rubber plug is used to prevent the cooling liquid from leaking out.

An operation process of the heat dissipation structure is as follows:

Before the LiDAR onboard UVA operates, the liquid outlet is opened, and the cooling liquid in the liquid storage tank flows into the drainage channels under the action of gravity and atmospheric pressure. The drainage channels are provided at the upper and lower ends of the heat dissipation interface in pairs, and alternately become upper and lower ends according to their relative positions. The upper end guides the cooling liquid to flow, so that the cooling liquid can be distributed all over the heat dissipation interface. In addition to guiding the cooling liquid, the lower end may also cooperate with an inclined angle of a groove wall at the lower end of the heat dissipation interface or a baffle to collect excessive cooling liquid at the heat dissipation interface. A contact angle θ between the surface material/coating on the heat dissipation interface and the cooling liquid should satisfy Formula (2) to ensure that the cooling liquid is attached to the heat dissipation interface and does not slide down.

When the LiDAR onboard UVA operates, the high-speed data acquisition and storage device and the laser can generate a lot of heat to increase its temperature and transfer heat with other surrounding substances. On one hand, the high-speed data acquisition and storage device and the laser conduct heat transfer with the heat dissipation panel through a heat conductive gel, and conduct the heat to the heat dissipation panel. Evaporation phase change of the cooling liquid in the drainage channel on the heat dissipation panel is accelerated under the action of the airflow generated by the operation of the UAV and the temperature rise of the heat dissipation panel, which can take away a large amount of heat and reduce the temperature of the heat dissipation panel, thus achieving the purpose of heat dissipation. On the other hand, the high-speed data acquisition and storage device and the laser conduct heat transfer with the air in the box body, which makes the air temperature rise. The hot air, due to small density, rises to make contact with the box lid, thus conducting heat transfer with the box lid. The specific heat capacity of the cooling liquid stored in the liquid storage tank in the box lid is much larger than that of the material of the box body itself, and the heat storage performance of the box body is enhanced, that is, the heat dissipation performance of the box body itself is enhanced, which can reduce an internal temperature of the box body to some extent. On one hand, the cooling liquid at the bottom of the liquid storage tank absorbs some heat and the temperature rises, which is conducive to accelerating the phase change process and increasing the utilization rate of the cooling liquid. On the other hand, the temperature rise of the cooling liquid and the heat dissipation panel leads to the reduction of the surface energy of the heat dissipation panel, which is beneficial to the attachment of the cooling liquid at the heat dissipation interface.

Comparison of the cooling effect of the heat dissipation structure of the present invention with that of the traditional fan cooling method under the following operating environments:

An ambient temperature is 30° C., a temperature of the heat dissipation panel of the LiDAR is 60° C., the flight speed of the UAV is 5 m/s, and the air humidity is 40%.

1. Two fans with a diameter of 5 cm, a rotating speed of 5000 RPM and an air volume of 10 CFM are adopted, and the heat that can be taken away by operating for one hour is 1200 KJ.
2. With this operating environment, the water is used as cooling liquid, the area of the heat dissipation interface is 200 $cm^2$, and the heat that can be taken away by operating for one hour is 5315.72 kJ.

Compared with the prior art, the present disclosure has significant improvements as follows:

(1) Heat dissipation performance: the temperature of a box is reduced by absorbing energy through the phase change of the cooling liquid, and the heat dissipation efficiency is beyond the reach of traditional air-cooling heat dissipation. Compared with the traditional phase change refrigeration (heat dissipation), the airflow generated by the normal operation of the UAV passes through the box body to accelerate the phase change process of the cooling liquid, and the heat dissipation performance is no less than that of the traditional phase change refrigeration (heat dissipation).

(2) Volume mass: Compared with the traditional phase change refrigeration (heat dissipation), there is no need of any additional devices, and all designs are combined with the box body, and an additional load on the UAV only comes from the mass of a small amount of cooling liquid.

(3) Environmentally friendly: there is no any energy consumption. The purpose of heat dissipation is achieved by consuming the cooling liquid.

Figure 1:
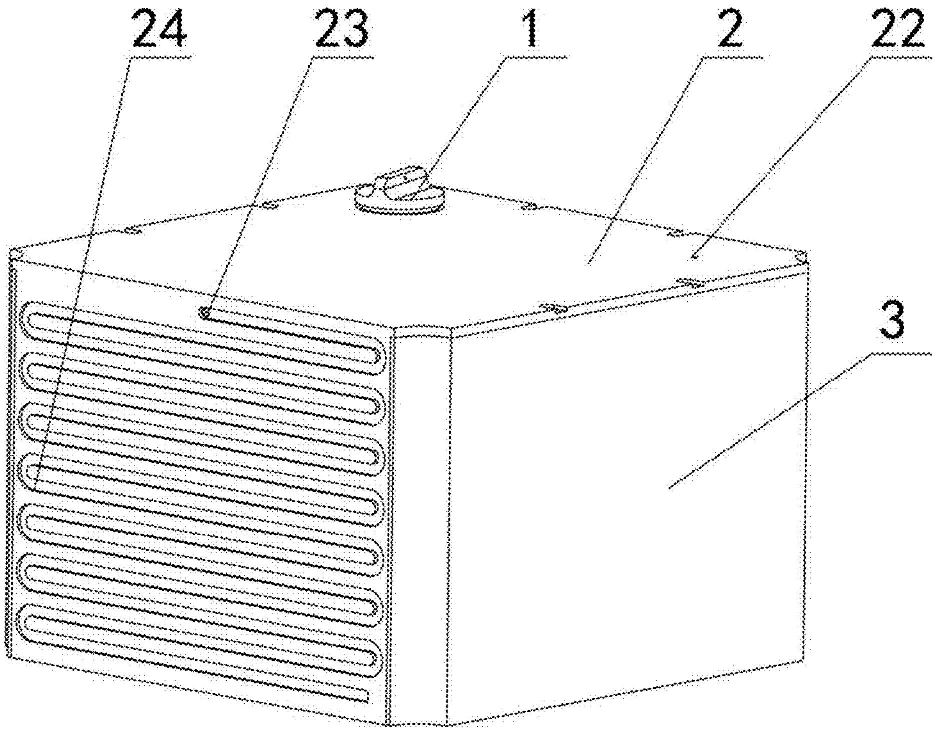
FIG. 1 is a schematic diagram of a liquid-curtain type heat dissipation structure for LiDAR onboard UAV according to the present disclosure.

In the drawings: 1—rubber plug; 2—box lid; 21—water inlet; 22—vent hole; 23—liquid outlet; 24—heat dissipation panel; 241—heat dissipation interface; 242—drainage channel; 25—liquid storage tank; 4—box seat.

DETAILED DESCRIPTION OF THE EMBODIMENTS

In order to make the invention goal, technical solutions and advantages of the present disclosure more clearly, the preferred embodiments are listed below, and the specific embodiments of the present disclosure will be further described in detail with the accompanying drawings.

EMBODIMENT

Figure 2:
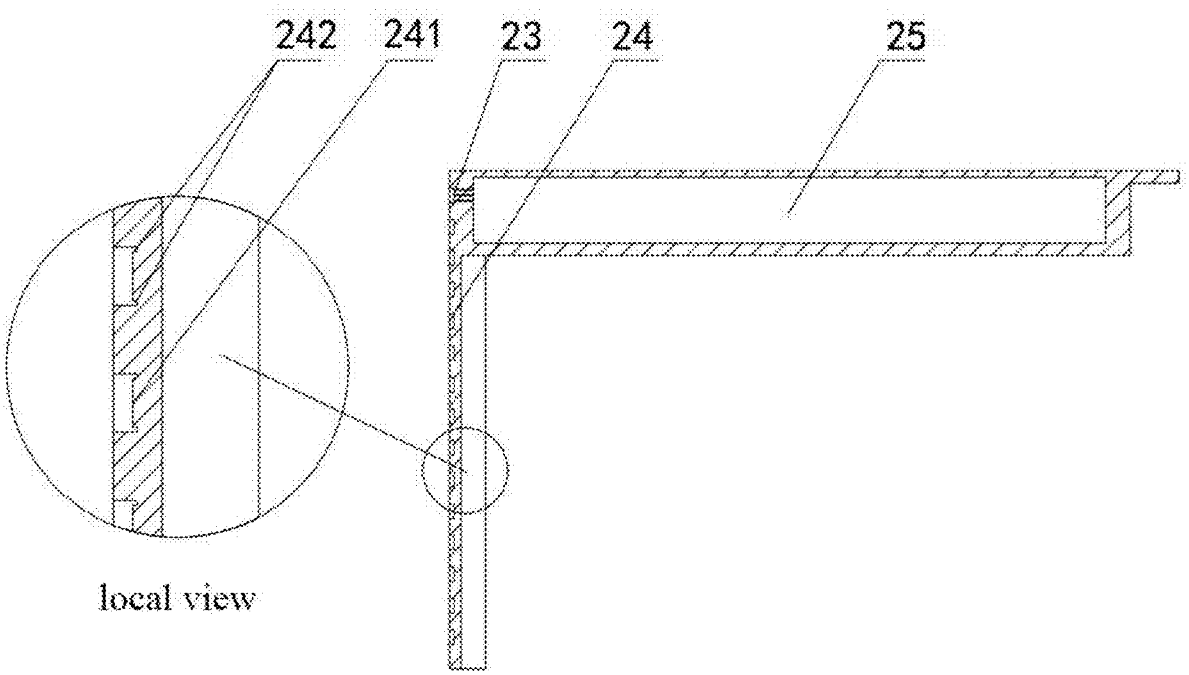
FIG. 2 is a side sectional view of a box lid of a liquid-curtain type heat dissipation structure for lidar onboard UAV according to the present disclosure.

In conjunction with FIG. 1 and FIG. 2:

Before the LiDAR onboard UVA operates, a liquid outlet 13 is opened, and cooling liquid in the liquid storage tank 26 flows into drainage channels 242 under the action of gravity and atmospheric pressure. The drainage channels 242 are provided at the upper and lower ends of the heat dissipation interface in pairs, and alternately become upper and lower ends according to their relative positions. The upper end guides the cooling liquid to flow, so that the cooling liquid can be distributed all over the heat dissipation interface. In addition to guiding the cooling liquid, the lower end may also cooperate with an inclined angle of a groove wall at the lower end of the heat dissipation interface or a baffle to collect excessive cooling liquid at the heat dissipation interface. A contact angle θ between the surface material/coating on the heat dissipation interface and the cooling liquid should satisfy Formula (2) to ensure that the cooling liquid is attached to the heat dissipation interface and does not slide down.

When the LiDAR onboard UVA operates, the high-speed data acquisition and storage device and the laser can generate a lot of heat to increase its temperature and transfer heat with other surrounding substances. On one hand, the high-speed data acquisition and storage device and the laser conduct heat transfer with the heat dissipation panel through a heat conductive gel, and conduct the heat to the heat dissipation panel. Evaporation phase change of the cooling liquid in the drainage channel on the heat dissipation panel is accelerated under the action of the airflow generated by the operation of the UAV and the temperature rise of the heat dissipation panel, which can take away a large amount of heat and reduce the temperature of the heat dissipation panel, thus achieving the purpose of heat dissipation. On the other hand, the high-speed data acquisition and storage device and the laser conduct heat transfer with the air in the box body, which makes the air temperature rise. The hot air, due to small density, rises to make contact with the box lid, thus conducting heat transfer with the box lid. The specific heat capacity of the cooling liquid stored in the liquid storage tank in the box lid is much larger than that of the material of the box body itself, and the heat storage performance of the box body is enhanced, that is, the heat dissipation performance of the box body itself is enhanced, which can reduce an internal temperature of the box body to some extent. On one hand, the cooling liquid at the bottom of the liquid storage tank absorbs some heat and the temperature rises, which is conducive to accelerating the phase change process and increasing the utilization rate of the cooling liquid. On the other hand, the temperature rise of the cooling liquid and the heat dissipation panel leads to the reduction of the surface energy of the heat dissipation panel, which is beneficial to the attachment of the cooling liquid at the heat dissipation interface.

Although the embodiments of the present disclosure have been disclosed as above, they are not limited merely to those set forth in the description and the embodiments, and may be applied to various fields suitable for the present disclosure. For those skilled in the art, other modifications may be easily achieved, and the present disclosure is not limited to the specific details and illustrations shown and described herein without departing from the general concept defined by the claims and their equivalents.

What is claimed is:

1. A liquid-curtain type heat dissipation structure for LiDAR onboard unmanned aerial vehicle, wherein a cooling liquid-curtain is formed in a heat dissipation interface such that heat dissipation is achieved by phase change of the cooling liquid in an operation environment; the structure comprises a micro liquid storage tank and a heat dissipation panel; a liquid inlet, a liquid outlet, and a vent hole are provided on the micro liquid storage tank, and a heat dissipation interface and a drainage channel are provided on the heat dissipation pane;

wherein the micro liquid storage tank which is configured to store the cooling liquid required is integrally formed on a box lid or is externally disposed, and a volume V in the tank satisfies Formula (1) to ensure working time, $$V \geq aT^{1.62}P^{-0.5}H^{-1.1}tS \tag{1}$$

wherein a is an environment influence coefficient, T is a temperature (° C.), P is an atmospheric pressure (Pa), H is ambient humidity (%), t is working time (h), and S is an area of a heat dissipation panel ($cm^2$);

wherein a caliber of the vent hole of the liquid storage tank is less than or equal to ¼of a total caliber of the liquid outlet, so as to adjust a liquid output amount; a diameter of a single liquid outlet is smaller than 1 mm, thus preventing a large amount of air from entering a box through the liquid outlet to reduce an adjustment effect of the vent hole; and a plurality of small-caliber liquid outlets are set to meet a flow demand; and wherein the heat dissipation panel is integrally formed on the box lid to ensure waterproof performance of a box body; a heat dissipation interface is provided on the heat dissipation panel, and a top of the heat dissipation interface is connected to the liquid outlet, and the heat dissipation interface is arranged in rows on the heat dissipation panel; meanwhile, drainage channels are provided at the liquid outlet and all layers of the heat dissipation interface, and a contact angle θ between a surface material/paint of the heat dissipation interface and the cooling liquid satisfies Formula (2) to ensure that the cooling liquid is attached to the heat dissipation interface and does not slide down;

$$\theta \leq 90° \tag{2}$$

wherein $$\theta = \cos^{-1}\{0.55 \ln \gamma_s - 1.1 \ln \gamma_l - 0.5Ra^2\}$$

$\gamma_s$ is solid surface energy (mN/m), $\gamma_l$ is liquid surface energy (mN/m), and Ra is surface roughness of the heat dissipation panel.

2. The liquid-curtain type heat dissipation structure for LiDAR onboard unmanned aerial vehicle according to claim 1, wherein a surface with large roughness or an absorbent coating is processed in the heat dissipation panel, the surface with large roughness or the absorbent coating is in cooperate with the drainage channels to ensure a maximum heat dissipation area of the cooling liquid; an inward fillet is provided at a lower end of the heat dissipation panel to avoid that under special circumstances, the cooling liquid enters the box and damages the device.

3. The liquid-curtain type heat dissipation structure for LiDAR onboard unmanned aerial vehicle according to claim 1, wherein a LiDAR component in the box is fixed to a box seat; in order to ensure efficient heat dissipation, a laser and a high-speed data storage device and other devices with serious power consumption and heat generation are configured to attach to an inner side of the heat dissipation panel, and a heat conducting material is disposed between the laser as well as the high-speed data storage device and the box lid as a propagation medium.

* * * * *